United States Patent
Jung et al.

(10) Patent No.: US 9,649,674 B2
(45) Date of Patent: May 16, 2017

(54) PARTICLE SIZE SELECTIVE REMEDIATION SYSTEM AND METHOD FOR HEAVY METALS-CONTAMINATED SOIL BY DRY-DISINTEGRATION AND SEPARATION

(71) Applicant: Hyundai Engineering & Construction Co., Ltd., Seoul (KR)

(72) Inventors: Jun Gyo Jung, Seoul (KR); Wan Hyup Kang, Yongin-si (KR); Hee Hun Chae, Yongin-si (KR); Kang Suk Kim, Seoul (KR)

(73) Assignee: Hyundai Engineering & Construction Co., Ltd., Seoul (KR)

( * ) Notice: Subject to any disclaimer, the term of this patent is extended or adjusted under 35 U.S.C. 154(b) by 308 days.

(21) Appl. No.: 14/386,288

(22) PCT Filed: Mar. 21, 2013

(86) PCT No.: PCT/KR2013/002329
§ 371 (c)(1),
(2) Date: Sep. 18, 2014

(87) PCT Pub. No.: WO2013/141619
PCT Pub. Date: Sep. 26, 2013

(65) Prior Publication Data
US 2015/0037099 A1  Feb. 5, 2015

(30) Foreign Application Priority Data

Mar. 22, 2012  (KR) ........................ 10-2012-0029437

(51) Int. Cl.
*B09C 1/00* (2006.01)
*B02C 21/00* (2006.01)
(Continued)

(52) U.S. Cl.
CPC ................ *B09C 1/00* (2013.01); *B02C 19/06* (2013.01); *B02C 21/00* (2013.01); *B02C 23/08* (2013.01); *B02C 23/14* (2013.01); *B07B 4/02* (2013.01)

(58) Field of Classification Search
CPC ...................................................... B09C 1/00
(Continued)

(56) References Cited

U.S. PATENT DOCUMENTS

2002/0079392 A1  6/2002  Tango

FOREIGN PATENT DOCUMENTS

JP  2005-028290 A  2/2005
JP  2005-081247 A  3/2005
(Continued)

OTHER PUBLICATIONS

International Search Report mailed Jul. 11, 2013, issued in corresponding International Application No. PCT/KR2013/002329, filed Mar. 21, 2013, 3 pages.
(Continued)

*Primary Examiner* — Sunil Singh
(74) *Attorney, Agent, or Firm* — Christensen O'Connor Johnson Kindness PLLC

(57) ABSTRACT

The present invention relates to a system and method of remediating heavy metal-contaminated soil using dry disintegration in a particle size-selective manner. The system for remediating contaminated soil comprises: a pretreatment unit for pretreating the contaminated soil to control the water content and the size of the soil; a disintegration unit for disintegrating the pretreated soil into individual particles; a particle separation unit for separating the disintegrated particles a standard particle size; a heavy metal removal unit for peeling off the surface of the separated soil particles larger than the standard particle size using a surface friction force
(Continued)

and an impact force to remove heavy metals in dry condition; and a separation and collection unit for separating and collecting the peeled-off surface from the soil particles.

8 Claims, 3 Drawing Sheets

(51) Int. Cl.
*B02C 23/14* (2006.01)
*B02C 19/06* (2006.01)
*B02C 23/08* (2006.01)
*B07B 4/02* (2006.01)

(58) Field of Classification Search
USPC ..... 405/128.1, 128.15, 128.45, 128.6, 128.7, 405/128.85
See application file for complete search history.

(56) References Cited

FOREIGN PATENT DOCUMENTS

| | | | |
|---|---|---|---|
| JP | 2005-254036 A | | 9/2005 |
| KR | 101194925 | * | 10/2012 |

OTHER PUBLICATIONS

Written Opinion of the International Searching Authority mailed Jul. 11, 2013, issued in corresponding International Application No. PCT/KR2013/002329, filed Mar. 21, 2013, 6 pages.

* cited by examiner

PARTICLE SIZE SELECTIVE REMEDIATION SYSTEM AND METHOD FOR HEAVY METALS-CONTAMINATED SOIL BY DRY-DISINTEGRATION AND SEPARATION

TECHNICAL FIELD

The present invention relates to a system and method for remediating contaminated soil. To be more specific, this is a system and method of remediating heavy metal-contaminated soil using dry disintegration in a particle size-selective manner. The contaminated soil is dry-disintegrated and separated according to particle size, and particles having a particle size corresponding to a high contamination level among the separated soil particles are selectively remediated.

BACKGROUND ART

In general, environmental pollution can be classified into air pollution, water pollution and soil contamination, and these are closely connected in that contaminants are transferred therebetween. In particular, soil contamination, which has been caused by sewage waste or atmospheric heavy metals, can pose a serious threat to food production. In industrial area, sewage and heavy metal-containing smoke from plants caused serious soil contamination.

In order to remediate contaminated soil, various soil remediation systems and methods have been developed. FIG. 1 is a block diagram showing one example of a conventional method for remediating contaminated soil. As can be seen therein, the method comprises: a stirring step of adding a cleaning solution to contaminated soil and stirring the mixture; four-stage separation and washing steps of separating soil particles from the stirred soil; three steps of washing the fine soil particles by spraying cleaning solution at high pressure; first and second fine particle separation steps of separating a large particle size from the soil; a precipitation step of adding mixed cleaning solution to the soil and precipitating the soil particles; and a filtration step of filtering the cleaning solution from the soil resulting from the precipitation step.

Briefly, contaminated soil is washed with a medium (cleaning solution, etc.) at high pressure while soil is separated and precipitated according to particle size, and the cleaning solution is filtered out.

However, the wet soil washing method has some problems, such as complex remediation process, large facility size, and producing heavy metal contaminated cleaning solution due to using the cleaning solution.

DISCLOSURE OF INVENTION

Technical Problem

The present invention has been made in order to solve the above-described problems. It provides a system and method of remediating contaminated soil using dry disintegration in a particle size-selective manner, in which the contaminated soil is dry-disintegrated and separated according to particle size, and specific-sized particles that needed to be washed, are selectively remediated.

Solution to Problem

To achieve the above object, the present invention provides a system for remediating heavy metal-contaminated soil using dry disintegration in a particle size-selective manner. The system comprises; a pretreatment unit for pretreating the contaminated soil to control the water content and the size of soil; a disintegration unit for disintegrating the pretreated soil into individual particles; a particle separation unit for separating the disintegrated particles based on a standard particle size; a heavy metal removal unit for peeling off the surface of the separated soil particles larger than the standard particle size using a surface friction force and an impact force to remove heavy metals; and a separation and collection unit for separating and collecting the peeled-off surface from the soil particles.

In the system of the present invention, the separation and collection unit is configured to return the collected soil particle surface to the disintegration unit, the particle separation unit or the heavy metal removal unit.

The disintegration unit or the particle separation unit is a cyclone-typed unit to separate the soil particles according to particle size by air.

The disintegration unit or the particle separation unit serves to separate the soil particles based on the standard particle size which determines the contaminated degree of the soil.

The separation and collection unit is configured to return the soil particles having a contaminant concentration higher than a standard concentration to the disintegration unit, the particle separation unit or the heavy metal removal unit by measuring and separating the contaminant concentration of the surface-peeled soil particles.

The present invention also provides a method for remediating contaminated soil using the above-described system. The method comprises steps of: (S100) pretreating the contaminated soil to control the water content and size; (S200) disintegrating the pretreated soils into individual particles in a dry manner; (S300) determining a standard particle size according to the contaminated degree of the soil and separating the soil particles by the standard particle size; (S400) peeling off the surface of the soil particles larger than the standard particle size using a surface friction force and an impact force in a dry manner; and (S500) separating and collecting the peeled-off surface from the soil particles.

Step (S100) comprises controlling the size of the soil after regulating the water content of the soil. The method of the present invention may further comprise the steps of: (S600) determining whether the measured contaminant concentration from previous step (S500) is lower than a standard contaminant concentration; and (S700) separately treating the soil particles having a contaminant concentration higher than the standard contaminant concentration from step S600 and the peeled-off soil surface resulting from step S500.

The method of the present invention may further comprise step (S800) of recycling the soil particles smaller than the standard particle size which separated in step (S300), and the surface-peeled soil particles determined to have a contaminant concentration smaller than the standard contaminant concentration in step (S600).

Advantageous Effects of Invention

As described above, time and cost required for the soil remediation process can be reduced as contaminated soil is remediated in a particle size-selective manner.

In addition, contaminated soil is disintegrated before particle size separation and is remediated by a heavy metal removal unit after being separated by an air floating method. Thus, the present invention has beneficial effects of simplifying the soil remediation process, reducing the area of facilities, and preventing soil disturbance and secondary contamination due to cleaning water compared to the wet washing process.

DESCRIPTION OF REFERENCE NUMERALS USED IN THE DRAWINGS

100: remediation system; 110: pretreatment unit;
120: disintegration unit; 130: particle separation unit;
140: heavy metal removal unit;
150: separation and collection unit.

BEST MODE FOR CARRYING OUT THE INVENTION

Hereinafter, there will be an explanation about remediating heavy metal-contaminated soil using dry disintegration in a particle size-selective manner according to a preferred embodiment of the present invention based on the accompanying drawings.

Figure 1:
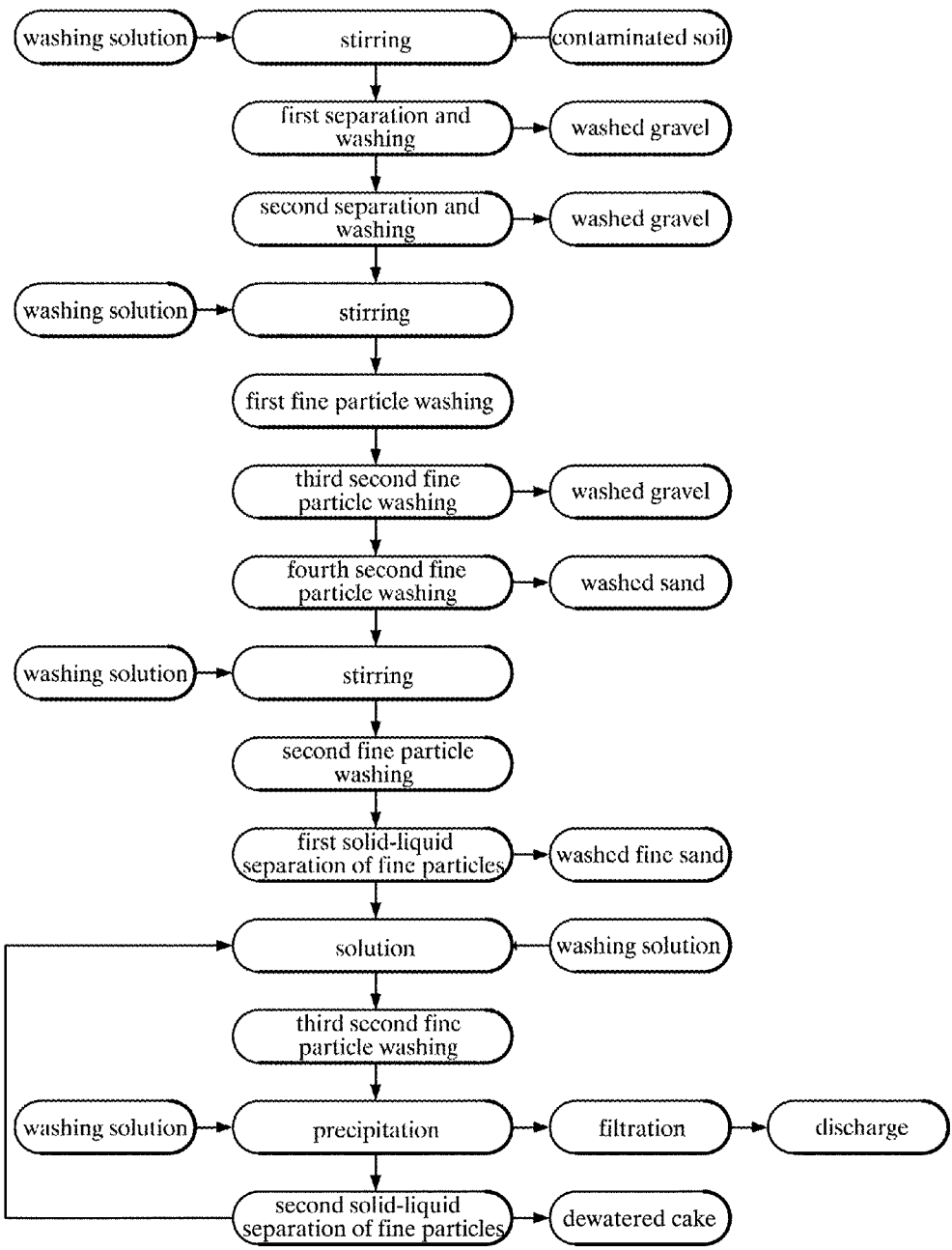
FIG. 1 is a block diagram showing a method for remediating contaminated soil according to the prior art.
Figure 2:
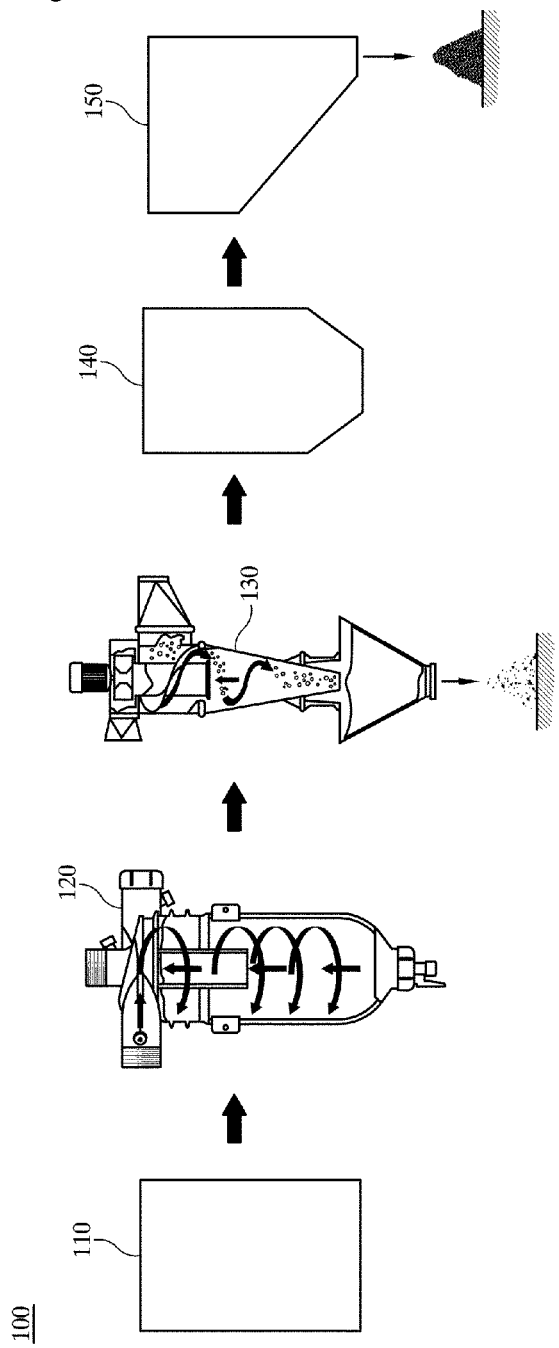
FIG. 2 schematically shows the configuration of a system for remediating heavy metal-contaminated soil using dry disintegration in a particle size-selective manner according to a preferred embodiment of the present invention.

FIG. 2 schematically shows a system for remediating heavy metal-contaminated soil using dry disintegration in a particle size-selective manner according to a preferred embodiment of the present invention.

As shown in FIG. 2, the system 100 for remediating heavy metal-contaminated soil using dry disintegration in a particle size-selective manner according to a preferred embodiment of the present invention comprises a pretreatment unit 110, a dry-disintegration unit 120, a particle separation unit 130, a heavy metal removal unit 140, and a separation and collection unit 150.

The pretreatment unit 110 serves to pretreat contaminated soil to make the soil size suitable for disintegration by controlling the water content of the soil. The disintegration unit 120 serves to disintegrate the pretreated soil into individual particles in a dry manner without using processing water. Herein, the pretreated soil has a specific content of water due to the evaporation during the pretreatment process. The collected contaminated soil may be allowed to stand naturally during a specific period of time to induce the natural evaporation of water or load into a high-temperature chamber for artificial evaporation. The particle separation unit 130 serves to separate the disintegrated soil particles into a standard particle size. Specifically, a certain particle size is selected based on the Environment Conservation Act, and the particle separation unit 130 separates the contaminated soil particles according to the selective particle size. In the rice field soil example of the present invention, it was shown that the contaminated degree of coarse soils, which had a particle size of, 75 μm or more, and were mostly composed of gravel and sand, exceeded the contamination standard. Thus, the particle separation unit 130 separates the contaminated soil particles into the standard particle size (e.g., 75 μm). Herein, an apparatus of separating soil particles floated by air is preferred as the screening unit 130, and a conventional air-floating separation apparatus (e.g., air-jet sand separator or air clarifier) is specifically used. FIG. 2 shows a cyclone-type air-floating separation apparatus which separates the soil particles according to particle size by spraying with air. The soil particles larger than the standard particle size (e.g., 75 μm), separated by the air-floating separation apparatus, are transferred into a heavy metal removal unit 140. Herein, the particle size standard can vary depending on a contaminated area and the contamination degree of soil. Also, a plurality of the particle separation units 130 and the heavy metal removal units 140, which corresponds to the number of the standard particle sizes, may also be installed. The particle separation unit 130 separates the contaminated soil smaller than the standard particle size (e.g., 75 μm), and after then, the concentration of contaminated soil is measured. If the concentration of contaminants is higher than the standard, the soil particles are separately treated, and if the concentration of contaminant is lower than the standard concentration, the soil particles are recycled for backfill. Herein, the standard concentration is, for example, 75 ppm for arsenic-contaminated soil.

Also, the heavy metal removal unit 140 serves to remediate the seriously contaminated soil particles that are larger than the standard particle size. Herein, the surface of the soil particles is peeled off by physical impact such as a surface friction force, and heavy metals are also removed by peeling off. In addition, the separation and collection unit 150 serves to separate and collect the peeled-off surface from the soil particles resulting from the heavy metal removal unit. The separation and collection unit 150 separates and collect the peeled-off surface from the remediated soil particles using various methods, including a vacuum or high-pressure air. Further, the separation and collection unit 150 measures the concentration of contaminants in the surface-peeled soil particles. If the concentration of contaminants is higher than the standard concentration, the unit returns the soil particle to the disintegration unit 120, the particle separation unit 130 or the heavy metal removal unit 140, and if the concentration of contaminants is lower than the standard concentration, the soil particles are recycled.

MODE FOR THE INVENTION

Remediation Method

Figure 3:
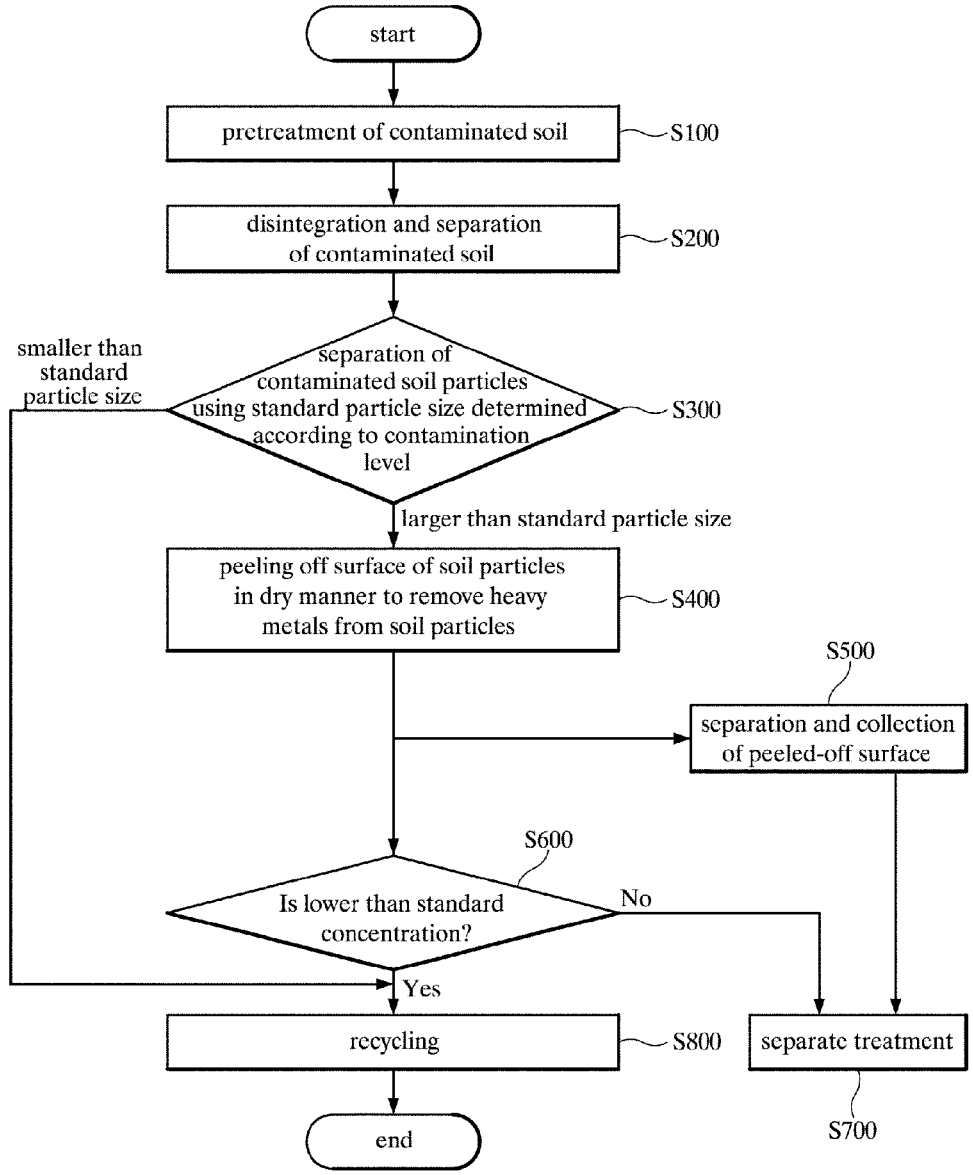
FIG. 3 is a block diagram showing a method for remediating contaminated soil using the system of FIG. 2.

FIG. 3 is a block diagram showing a method for remediating contaminated soil using the remediation system of FIG. 2.

As shown in FIG. 3, in the inventive method of remediating contaminated soil particles in a particle size-selective manner, contaminated soil collected from a specific area is first dry-pretreated (S100). In this step, the size and water content of the contaminated soil are controlled. A water supply unit is required when contaminated soil is dispersed in processing water according to the prior method. Thus, an apparatus for purifying the water should be further installed. However, the dry process can eliminate additional apparatuses and simplify the process.

Then, the contaminated soil masses from step (S100) are disintegrated and separated according to particle size (S200). In this disintegration step employing the disintegration unit 120, compressed air is used while solvent is unused.

Then, a standard particle size is determined according to the contaminated degree of the soil, and the contaminated soil particles are separated based on the standard particle size S300. In this step, the particle separation unit 130 separates the contaminated rice field soil particles according to the standard particle size (e.g., 75 μm). In the case of garden soil, mountainous area soil or the like, separate standard can be selected for disintegration based on the collected samples. In addition, the contaminated soil particles may also be separated into a plurality of particle sizes depending on the contaminated degree of the soil. Air is injected into the particle separation unit 130 to float the soil particles which are then separated according to particle size. Herein, the soil particles smaller than the standard particle size (e.g., 75 µm) which do not require remediation due to less or not contaminated are recycled for backfill (S800) as described below. In addition, if the concentration of contaminants in the soil particles smaller than the standard particle size (e.g., 75 µm) is higher than the standard concentration (for example, a standard value provided by law), the soil particles are separately treated, and if the concentration is lower than the standard concentration, the soil particles are recycled for backfill (S800).

Then, the selected contaminated soil particles are remediated using a surface friction force and an impact force in the heavy metal removal unit 140 (S400). When coarse particles such as gravel and sand have a high concentration of heavy metal contaminants, soil particles larger than the standard particle size (e.g., 75 µm) are selected and transferred into the heavy metal removal unit 140, in which the surface of the soil particles is physically peeled off either by surface friction with fillers or by surface friction therebeween. The surface peeled off from the soil particles is removed together with heavy metal. In addition, soil particles smaller than the standard particle size and contain a high concentration of heavy metal contaminants, can be selected, and heavy metals can be removed by a dry process.

Next, the peeled-off surface is separated and collected from the soil particles (S500). Thus, the surface separated from the soil particles is collected in the heavy-metal removal unit 140. Then, the collected surface is separately treated (S700) and recycled for backfill (S800).

Next step is to determine whether the surface from the separation and collection step (S500) is less than the standard (S600). Last, if the concentration of contaminants in the soil particles is higher than the standard, the soil particles are separately treated (S700), and if the concentration of contaminants is lower than the standard, the soil particles are recycled for backfill (S800). Herein, the soil particles having a contaminant concentration higher than the standard concentration are returned to the disintegrating step (S200) or the heavy metal removal step (S400) for retreatment. In the separate treatment step (S700), the peeled-off surfaces or the soil particles, which have a contaminant concentration higher than the standard concentration, are returned to any one of the disintegrating step (S200), the separation step (S300) or the heavy metal removal step (S400).

Although the preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:
1. An apparatus for remediating heavy metal-contaminated soil in a particle size-selective manner, comprising:
 a pretreatment unit for pretreating the contaminated soil to control water content of the contaminated soil and particle size of the soil;
 a disintegration unit for disintegrating the pretreated soil into individual particles in a dry manner;
 a particle separation unit for separating the disintegrated particles based on a standard particle size;
 a heavy metal removal unit for peeling off the surface of the separated soil particles larger than the standard particle size using a surface friction force and an impact force to remove heavy metals; and
 a separation and collection unit for separating and collecting the peeled-off surface from the soil particles.

2. The apparatus of claim 1, wherein the disintegration unit or the particle separation unit is a cyclone-type unit for separating the soil particles according to particle size using air.

3. The apparatus of claim 1, wherein the disintegration unit or the particle separation unit serves to separate the soil particles based on the standard particle size determined by a contamination degree of the soil.

4. The apparatus of claim 1, wherein the separation and collection unit is configured to measure contaminant concentration of the surface-peeled soil particles, and to separate and return the soil particles having a contaminant concentration higher than a standard contaminant concentration to the disintegration unit, the particle separation unit or the heavy metal removal unit.

5. A method for remediating contaminated soil using the system of claim 1, the method comprising steps of:
 (S100) pretreating the contaminated soil to control water content of the contaminated soil and particle size of the contaminated soil;
 (S200) disintegrating the pretreated soil into individual particles in a dry manner;
 (S300) determining a standard particle size according to a contamination degree of the soil and separating the soil particles;
 (S400) peeling off the surface of the soil particles larger than the standard particle size using a surface friction force and an impact force in a dry manner; and
 (S500) separating and collecting the peeled-off surface from the soil particles.

6. The method of claim 5, wherein step (S100) comprises controlling the water content of the soil to a predetermined level or below, and then controlling the particle size of the soil to a predetermined level or below.

7. The method of claim 5, wherein the method further comprises, after step (S500), the steps of:
 (S600) measuring contaminant concentration of the soil particles resulting from step (S500) and determining whether the measured contaminant concentration is lower than a standard contaminant concentration; and
 (S700) separately treating the soil particles having a contaminant concentration higher than the standard contaminant concentration from step S600, and the peeled-off soil surface resulting from step S500.

8. The method of claim 7, wherein the method further comprises, step (S800) of recycling unselected small size soil particles separated in step (S300) and surface-peeled soil particles having a contaminant concentration smaller than the standard contaminant concentration in step (S600) after step (S700).

* * * * *